United States Patent [19]
Butler et al.

[11] Patent Number: 5,649,567
[45] Date of Patent: Jul. 22, 1997

[54] SEALING ARRANGEMENT, FOR USE WITH, AND IN COMBINATION WITH, A STEAM AND FUEL OIL CONTROL AND FURGE VALVE, AND A VALVE SEAT THEREFOR

[75] Inventors: Ronald G. Butler, Mountville; Wayne R. Houck, Columbia; John R. Lehman, Maytown; Roy D. Miller, Landisville, all of Pa.

[73] Assignee: ITT Fluid Technology Corporation, Midland Park, N.J.

[21] Appl. No.: 489,524

[22] Filed: Jun. 12, 1995

[51] Int. Cl.⁶ ........................................ F16K 17/38
[52] U.S. Cl. .............. 137/468; 137/329.01; 137/630.22; 251/361; 251/368
[58] Field of Search ..................... 251/360, 361, 251/368, 362, 359; 137/327, 329.01, 630.22, 468

[56] References Cited

U.S. PATENT DOCUMENTS

| | | | |
|---|---|---|---|
| Re. 25,251 | 10/1962 | Quail | 251/362 |
| 978,928 | 12/1910 | O'Malley | 251/360 |
| 2,942,622 | 6/1960 | Hahn et al. | 251/359 |
| 3,022,978 | 2/1962 | Kowalski et al. | 251/362 |
| 3,223,110 | 12/1965 | Mueller et al. | 137/327 |
| 4,146,056 | 3/1979 | Buchanan | 137/630.22 |
| 4,736,083 | 4/1988 | Saville | 251/368 |
| 4,765,592 | 8/1988 | Minai | 251/368 |

Primary Examiner—A. Michael Chambers
Attorney, Agent, or Firm—Menotti J. Lombardi

[57] ABSTRACT

A circular body, having a throughgoing orifice, an externally threaded periphery, and a pair of stepped recesses, defines a valve seat for a reciprocating piston. A retaining ring is made fast in one of the recesses, and a seal which contracts upon cooling to the ambient, after having been exposed to elevated temperatures, is set in the other recess. The seal is formed of a composite of plastic in which are dispersed carbon fibers to render the seal resistant to creep. A housing having a pair of chambers formed therein has the orificed body and piston interposed between the chambers for valvingly controlling inter-chamber communication.

5 Claims, 4 Drawing Sheets

SEALING ARRANGEMENT, FOR USE WITH, AND IN COMBINATION WITH, A STEAM AND FUEL OIL CONTROL AND PURGE VALVE, AND A VALVE SEAT THEREFOR

BACKGROUND OF THE INVENTION

This invention pertains to steam and fuel oil control and purge valves, such as are used in the firing of industrial oil burners and auxiliary or igniter burners associated with large utility burners, and in particular to a sealing arrangement for use with, and in combination with such valves, and to a novel valve seat for such sealing arrangements. Valves of the aforesaid type must satisfy specific regulatory leakage specifications, Factory Mutual in particular, and have a limited acceptance leakage. The specifications also require a Proof of Closure (POC) switch. The basic concept is that, as the valve begins to close, oil flow stops, the valve continues closed tripping the POC, and finally ends up making the metal to metal seal. When opening, the valve piston begins to move, causing the POC to trip prior to any oil flow, and travel continues to the full open position. The POC switch must trip going closed after oil flow stops, and before going metal to metal, the POC switch must trip going open before oil flow starts again. This process cannot be satisfied if the seal leakage exceeds the allowable.

Valves of the aforesaid type commonly comprise a housing having a pair of chambers formed therein, means for admitting fuel into one of the chambers, means for discharging fuel from the other of said chambers, means for admitting steam into the other chamber, and valving means interposed between the chambers. The valving means is operative (a) for effecting communication between the chambers, and (b) for closing off communication therebetween, and comprises a valve seat-and a piston movable onto and from the seat, for closure of one of the chambers from the other, and for opening the chambers onto each other. Typically, the piston carries an annular seal in a recess provided therefor.

Exemplary of such an aforesaid steam and fuel oil control and purge valve is U.S. Pat. No. 4,146,056, bearing the same title, and issued to Bascom F. Buchanan, on Mar. 27, 1979. As noted, the patented valve has a translating piston which enters an orificed insert, the latter having an annular land, and the piston has a tapered flange or skirt which seats against the land. The piston-carried seal sealingly engages the wall of the orifice to prohibit inter-chamber communication. The seal is formed of plastic, i.e., virgin tetrafluoroethylene, and upon exposure to elevated temperature, exhibits creep. An option for the prior art valve was a reinforced tetrafluoroethylene. However, this material reacted in the same, unfavorable way to temperature and creep as virgin tetrafluoroethylene. The plastic moves away from the load; the load is created due to the interference fit between the seal outside diameter and the orifice wall. This is a natural response to load over time, and is accelerated by the temperature exposure. The creep of the plastic manifests itself by an attempt to fill the clearance gap between the piston and the wall of the orifice and, as a result thereof, the plastic displaces up and down the orifice wall. Subsequently, when the valve is cooled back to ambient temperatures, the plastic shrinks back toward the carrying piston. Therefore, the outer diameter of the seal becomes smaller. The effect results in a loss of the interference fit between the seal and the wall of the orifice; fluid flows freely past the seal and through the clearance fit which the shrunk or contracted seal presents.

SUMMARY OF THE INVENTION

It is an object of this invention to obviate the afore-described problem by setting forth a sealing arrangement, for use in a steam and fuel oil control and purge valve, comprising a housing; said housing having chambers formed therewithin; valving means interposed between said chambers, and operative (a) for effecting communication between said chambers, and (b) for closing off communication therebetween; wherein said valving means comprises a valve seat and a piston movable onto and from said seat; and sealing means set in said seat for sealingly receiving said piston therewithin; wherein said sealing means comprises a seal contractible in response to a cooling thereof to the ambient, following an exposure thereof to elevated temperatures.

It is also an object to disclose a valve seat for a sealing arrangement, comprising a circular body; wherein said body has (a) a throughgoing orifice, (b) an annular land, (c) an externally threaded periphery, and (d) a pair of stepped recesses.

Too, it is an object of this invention to set out a steam and fuel oil control and purge valve which meets the standards of the aforesaid regulatory leakage specifications. The novel valve stops flow, trips a POC switch and then continues to close, while offering a remarkable sealing due to the use of a plastic seal which has a low creep characteristic.

Yet another object of this invention is to set forth a sealing arrangement, in combination with a steam and fuel oil control and purge valve, comprising a housing; said housing having a pair of chambers formed therewithin; means for admitting fuel into one of said chambers; means for discharging fuel from the other of said chambers; means for admitting steam into said other chamber; valving means interposed between said chambers, and operative (a) for effecting communication between said chambers, and (b) for closing off communication therebetween; wherein said valving means comprises (a) a valve seat, and (b) a piston movable onto and from said seat; and sealing means set in said seat for sealingly receiving said piston therewithin; wherein said sealing means comprises a seal contractible in response to the ambient, following an exposure thereof to elevated temperatures.

BRIEF DESCRIPTION OF THE PREFERRED EMBODIMENTS

By way of example, the invention is disclosed in connection with a steam and fuel oil control and purge valve, such as that set out in the aforementioned U.S. Pat. No. 4,146, 056. Too, for a fuller understanding of the purpose and functioning of such valves, the cited patent is hereby incorporated by reference.

Figure 1:
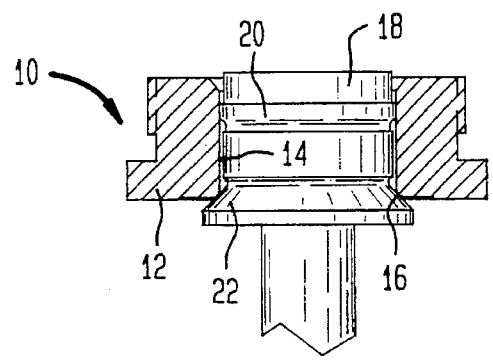
FIG. 1 is an illustration, partly cross-sectioned, of a prior art valving means for a steam and fuel oil control and purge valve, the piston being shown in full line, and the valve seat being cross-sectioned, and the valving means being in a closed disposition.

Steam and fuel oil control and purge valves have a housing with a pair of chambers formed therein, means for admitting fuel oil into one of the chambers, means for discharging fuel oil from the other of said chambers, means for admitting-steam into the other chamber, and valving means interposed between the chambers for effecting, and prohibiting communication between the chambers. In FIG. 1 is a prior art valving means 10, such as is interposed between the referenced chambers; the same represents the valving means incorporated in the U.S. Pat. No. 4,146,056. Valving means 10 comprises a valve seat insert 12, of circular configuration, having an externally threaded periphery, and a throughgoing orifice 14. An end opening 16 of the orifice 14 is slightly radiused, in this embodiment; a slight taper would serve just as well. A piston 18 is reciprocably received in the orifice 14, and carries an annular seal 20 thereabout for effecting a fluid sealing with the wall of the orifice 14. In addition, the piston 18 has an outwardly extending and tapered skirt or flange 22 for closure thereof onto the radiused end opening 16 of the orifice. When the piston 18 is withdrawn from the valve seat insert 12, clearly the valving means is open to fluid flow therethrough. As the piston 18 enters the insert 12, the seal 20 sealingly moves along the wall of the orifice to effect a preliminary closing of the valving means 10. When the skirt or flange 22 seats against the end opening 16 of the orifice 14, the valving means is fully closed.

Figure 2:
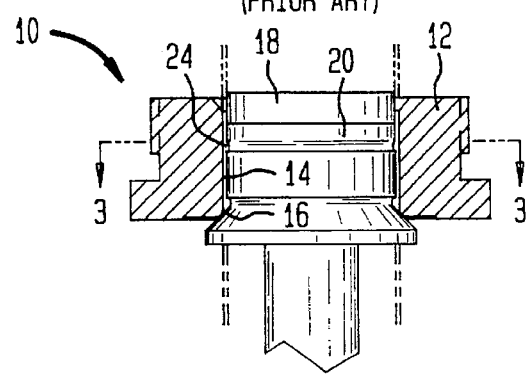
FIG. 2 is an illustration like that of FIG. 1, of the same prior art valving means, now shown at ambient temperature, following an exposure thereof to elevated temperatures.
Figure 3:
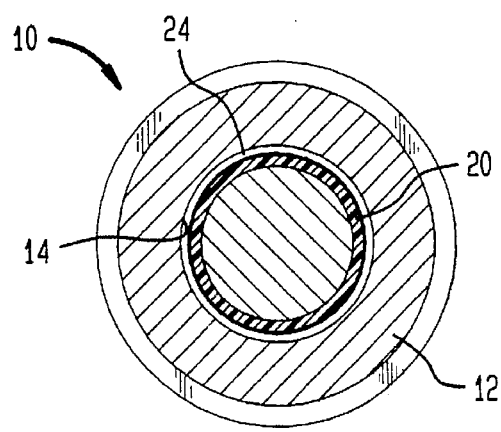
FIG. 3 is a cross-sectional view taken along section 3—3 of FIG. 2.

As earlier noted, the seal 20, for being exposed to the elevated temperature of steam, creeps when it enters the orifice 14 and migrates up and down the wall of the orifice. The seal may not see direct steam, but the temperature effects of the steam. Also, the seal does not creep instantly when it enters the orifice; this creep happens over time. As the closed valving means 10 cools down, however, the seal 20, for being plastic, shrinks or contracts onto the piston 18. The outer diameter of the seal 20, then is reduced, due to the combination of creep and contraction, and a clearance fit presents itself between the seal 20 and the wall of the orifice 14. This is shown in FIGS. 2 and 3 where the valving means 10 has undergone an elevated temperature exposure, and now has cooled down to the ambient temperature. The seal 20 has contracted tightly onto the piston 18 and opened the clearance fit 24 shown, the width thereof being represented by the projection broken lines in FIG. 2.

Figure 4:
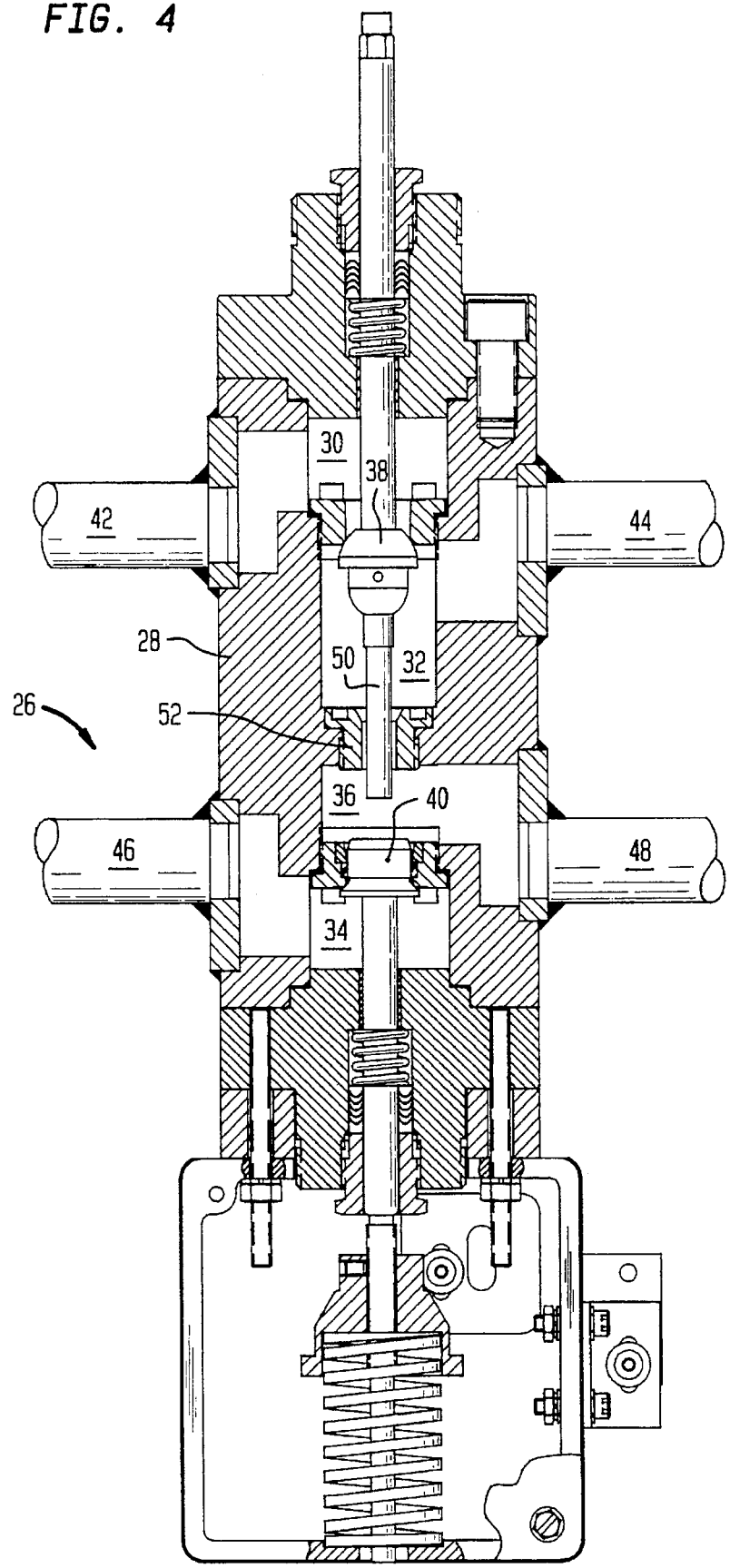
FIG. 4 is an axial, cross-sectional view of the major functioning portion of a steam and fuel oil control purge valve which incorporates the invention.

FIG. 4 depicts the principal portion of a stem and a fuel oil control purge value 26. Value 26 comprises a housing 28 in which is a stem inlet chamber 30 and a stem outlet chamber 32, a fuel oil inlet chamber 34, and a fuel oil outlet chamber 36, with valving means 38 interposed between chambers 30 and 32, and valving means 40 interposed between chambers 34 and 36. Conduits 42 and 44 admit and discharge steam into and from the housing, respectively, and conduits 46 and 48 admit and discharge fuel oil into and from the housing 28, respectively. A lower stem 50, of valving means 38 penetrates a valve seat 52, with a clearance in this operational disposition of the valve 26, to permit steam to enter chamber 36 when the valving means 38 is open. More detailed explanation of the operation of valve 26 can be gleaned from the cited U.S. Pat. No. 4,146,056 and is deemed not necessary for disclosure here, as such is ancillary to the subject invention.

Figure 5:
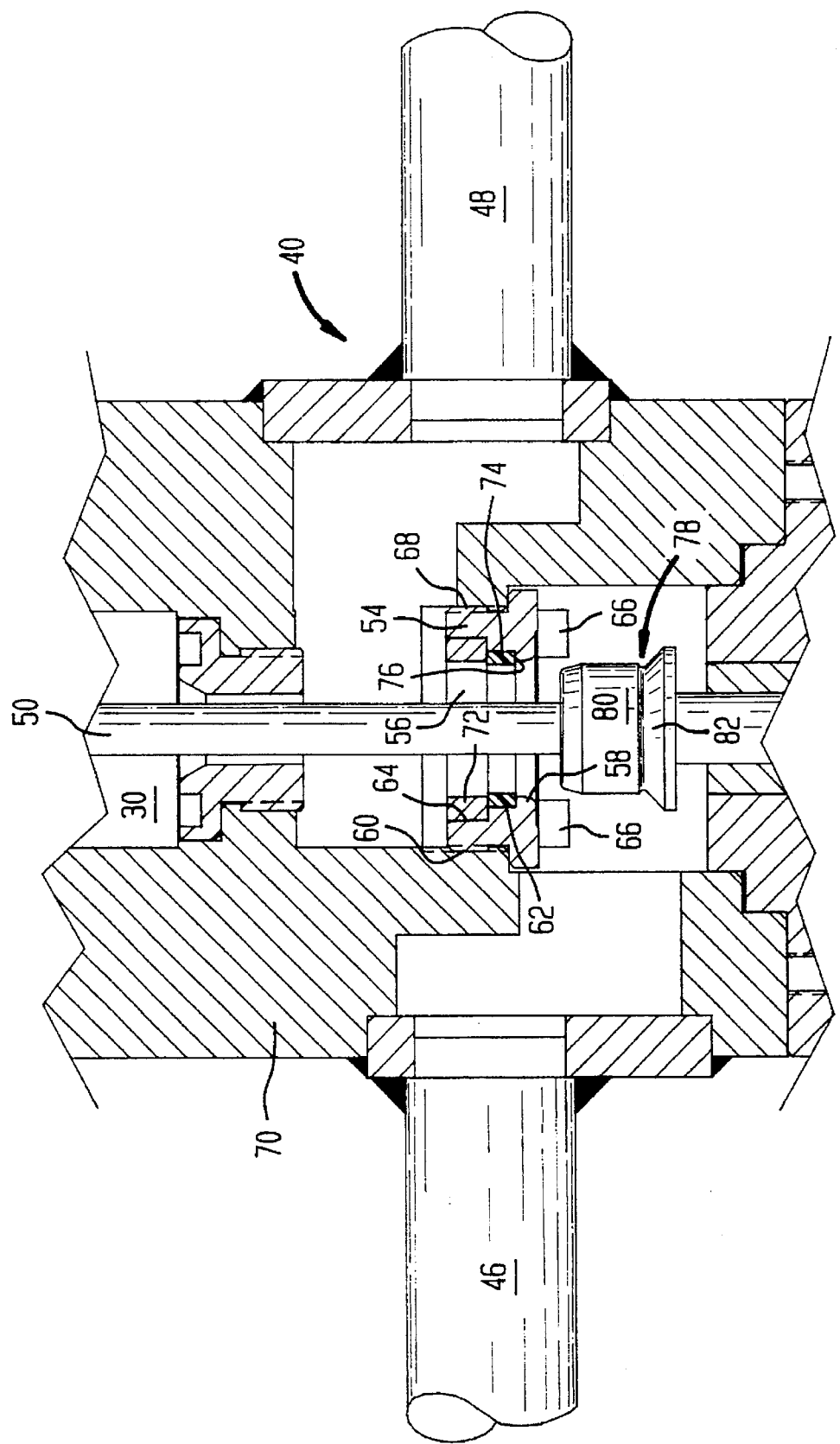
FIG. 5 is an enlarged view of the portion of the valve in FIG. 4 in which two chambers and valving means are located, the same showing the valving means in an open condition.
Figure 6:
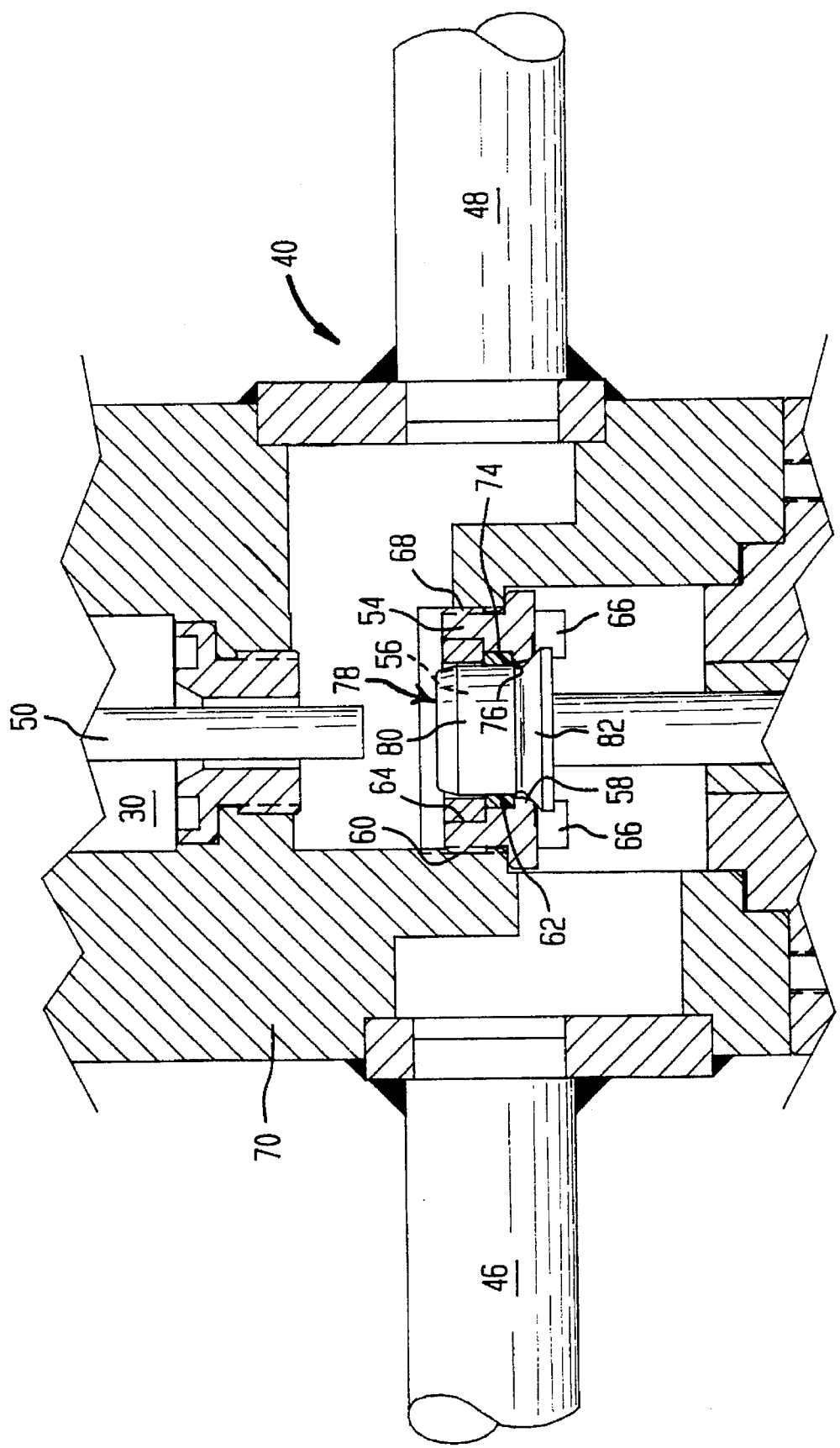
FIG. 6 is a view like that of FIG. 5 in which, however, the valving means is in a closed condition.

Valving means 40 comprises an embodiment of the invention, and greatly enlarged depictions thereof are presented in FIGS. 5 and 6. Valving means 40 comprises a housing insert, the same being a circular body 54 which has a throughgoing orifice 56, an annular land 58 of radiused configuration, and externally threaded periphery 60, and a pair of stepped recesses 62 and 64. For enabling insertion and removal the body 54 has wrenching tabs 66 depending therefrom. The threaded periphery 60 is threadedly received in a correspondingly-threaded annulus 68 formed in the housing 70. A retaining ring 72 is made fast in recess 64, and a seal 74 is set in the recess 62. The seal 74 is held captive between the ring 72 and the land 76 defined by the lowermost portion of the recess 62.

In FIG. 5, a piston 78 is shown removed from the body 54, the body comprising the valve seat for the piston. The piston 78 has a substantially cylindrical leading portion 80 and a contiguous, trailing portion 82 comprising a tapered skirt or flange. Portion 80, with closing of the valving means 40, enters the orifice 56 and makes a sealing engagement with the seal 74, whereas the flange 82 sealingly closes onto the radiused land 58 of the body 54.

FIG. 6 shows the valving means 40 with the piston 78 fully entered into the orifice 56, with the portion 80 thereof in sealing engagement with the seal 74, and the flange portion 82 is sealingly closed against the land 58 of the valve seat or body 54. By way of example, seal 74 is formed of a composite comprising carbon fibers dispersed in a given plastic, namely: polytetrafluoroethylene-co-perfluoropropylvinylether (PFA).

Whatever the temperature (within the limits of the seal material) to which the seal 74 is subjected, it efficiently closes off the valving means 40 when the piston 78 leading portion 80 enters therein. Then, as the closed valving means 40 cools down to the ambient temperature, the plastic/ carbon fibers seal 74 contracts tightly onto the portion 80 of the piston 78 insuring against any leakage through the valving means 40.

The seal 74, by the nature of its plastic and carbon fiber composition, resists creep even at elevated temperatures, and this is the novel benefit which improves the performance of the valving means 40. As the seal 74 has minimal creep, its plastic composition does not creep into the gap obtaining between the piston 78 and the wall of the orifice 56. Too, as noted, when the valving means 40 is cooled to the ambient, the shrinkage or contraction of the seal 74 causes it to clasp the piston 78 more tightly; this increases the interference fit and improves the sealing effect. As a result, the seal 74 retains its sealing capability even after multiple exposures to elevated temperatures. The invention teaches using the inherent shrinkage or contraction of the seal 74 to enhance the sealing, and the forming of the seal from a plastic and carbon fibers composition which exhibits minimal creep to prevent any loss of sealing interference with the wall of the orifice 56. The seal 74 is captive between the ring 72 and the land 76, and the wall of the recess 62; only the inner diameter thereof is susceptible of change, by its contraction, increasing its interference with the piston 78 and improving the sealing of the valving means 40.

While we have described our invention in connection with specific embodiments of a sealing arrangement for use with, or in combination with, a steam and fuel oil control and purge valve 26, and a novel valve seat or body 54, with a given composite of seal 74, it is to be clearly understood that this is done only by way of example, and not as a limitation to the scope of our invention, as set forth in the objects thereof and in the appended claims. Other composites of plastic and fibers, or any seal material which produces a seal less susceptible to creep and normally subject to contraction, can be used as well as the seal 74 disclosed herein. The teaching of this invention comprises the capture of the sealing element, as noted in the foregoing, in the valve seat or body 54 so that only its inner diameter can shrink to increase its sealing capability. Alternative compositions of sealing elements which manifest the inventive objects of this invention, proceeding from our teaching herein, are deemed to be within the ambit of our invention and embraced by the appended claims. Too, the invention, albeit disclosed in connection with a steam and fuel oil control and purge valve 26, has a more universal application. Any sealing requirement which calls for a seal which must be exposed to elevated temperatures and thermocycles can use the teaching of this invention to advantage, as well as applications which require sealing of stems or shafts of rotary or reciprocable motion.

We claim:

1. A sealing arrangement, in combination with a steam and fuel oil control and purge valve, comprising:

a housing;

said housing having a pair of chambers formed therewithin;

means for admitting fuel into one of said chambers;

means for discharging fuel from the other of said chambers;

means for admitting steam into said other chamber;

valving means interposed between said chambers, and operative (a) for effecting communication between said chambers, and (b) for closing off communication therebetween; wherein said valving means comprises (a) a valve seat, and (b) a piston movable into and out from said valve seat, said piston having a body defining a cylindrical surface with a flange that extends radially out from one end of said body, said valve seat comprising a circular body having an inside surface which defines an orifice extending through said body, an annular land encircling one end of said orifice, and an annular recess defined on said inside surface, wherein said body of said piston enters said orifice of said valve seat and said flange of said piston engages said annular land of said valve seat when said piston moves into said valve seat; and sealing means set in said recess of said seat for sealingly engaging said cylindrical surface of said body of said piston therewithin; wherein said sealing means comprises a seal contractible in response to the ambient, following an exposure thereof to elevated temperatures.

2. A sealing arrangement, in combination with a steam and fuel oil control and purge valve, comprising:

a housing;

said housing having a pair of chambers formed therewithin;

means for admitting fuel into one of said chambers;

means for discharging fuel from the other of said chambers;

means for admitting steam into said other chamber;

valving means interposed between said chambers, and operative (a) for effecting communication between said chambers, and (b) for closing off communication therebetween; wherein said valving means comprises (a) a valve seat, and (b) a piston movable into and out from said valve seat, said piston having a body defining a cylindrical surface with a flange that extends radially out from one end of said body, said valve seat comprising a circular body having an inside surface which defines an orifice extending through said body, an annular land encircling one end of said orifice, and an annular recess defined on said inside surface, wherein said body of said piston enters said orifice of said valve seat and said flange of said piston engages said annular land of said valve seat when said piston moves into said valve seat;

said body of said valve seat including an externally threaded periphery; and sealing means set in said recess of said seat for sealingly engaging said cylindrical surface of said body of said piston therewithin; wherein said sealing means comprises a seal contractible in response to the ambient, following an exposure thereof to elevated temperatures.

3. A sealing arrangement, in combination with a steam and fuel oil control and purge valve, comprising:

a housing;

said housing having a pair of chambers formed therewithin;

means for admitting fuel into one of said chambers;

means for discharging fuel from the other of said chambers;

means for admitting steam into said other chamber;

valving means interposed between said chambers, and operative (a) for effecting communication between said chambers, and (b) for closing off communication therebetween; wherein said valving means comprises (a) a valve seat, and (b) a piston movable into and out from said valve seat, said piston having a body defining a cylindrical surface with a flange that extends radially out from one end of said body, said valve seat comprising a circular body having an inside surface which defines an orifice extending through said body, an annular land encircling one end of said orifice, and an annular recess defined on said inside surface, wherein said body of said piston enters said orifice of said valve seat and said flange of said piston engages said annular land of said valve seat when said piston moves into said valve seat;

sealing means set in said recess of said seat for sealingly engaging said cylindrical surface of said body of said piston therewithin; wherein said sealing means comprises a seal contractible in response to the ambient, following an exposure thereof to elevated temperatures; and said body of said valve seat including an externally threaded periphery, a second recess defined in said inside surface, and a retaining ring made fast in said second recess.

4. The combination, according to claim 3, wherein:

said seal comprises an annular element; and said element is formed of a composite material comprising carbon fibers dispersed in a plastic substance.

5. The combination, according to claim 4, wherein:

said plastic substance comprises polytetrafluoroethylene-coperfluoropropylvinylether.

\* \* \* \* \*